Patented Apr. 23, 1940

2,198,050

UNITED STATES PATENT OFFICE 2,198,050

CONVERSION PRODUCTS OF PYRENE

Heinrich Hopff and Hans Schoenherr, Ludwigshafen-on-the-Rhine, Germany, assignors, by mesne assignments, to General Aniline & Film Corporation, New York, N. Y., a corporation of Delaware No Drawing. Application September 16, 1938, Serial No. 230,281. In Germany January 29, 1937

5 Claims. (Cl. 260—670)

The present invention relates to conversion products of pyrene and a process of producing them. This application is a continuation-in-part of our copending application Ser. No. 186,087 filed January 21, 1938.

We have found that pyrene is capable of being converted into colored substances which are suitable for various technical purposes by bringing pyrene in the vapor phase in a vigorous stream into contact with walls heated to a high temperature. The temperature shall preferably be over 600° C. The optimum range of the temperature lies between 750 and 850° C. The temperature depends somewhat on the speed of gaseous pyrene. The speed is preferably so chosen that a half gramme molecule of pyrene is led per hour through each liter of the reaction room. The gaseous pyrene may be diluted with an inert gas the amount of which is preferably about equal to that of pyrene vapor.

In order to carry our invention into effect the following procedure may be chosen for example.

Pyrene is heated and vaporized and led in admixture with an inert gas such as nitrogen, argon, carbon dioxide or steam through a tube which is heated to the reaction temperature. In order to enlarge the surface with which the vapors are brought into contact filler bodies may be brought into the reaction room. The tube and the filler bodies may consist of copper or iron or also of alumina and the like. Another suitable method of working consists in using narrow tubes which do not contain filler bodies. A plurality of the said narrow tubes may be used in one combined apparatus. The reaction product leaves the reaction chamber in the form of from orange-red to dark red vapors. They are allowed to cool, preferably by bringing them into contact with cooled walls or by leading them through cooled tubes.

The substances thus formed are yellow-red to brown-red crystalline bodies which dissolve in organic solvents and especially in solvents free from oxygen giving a yellow coloration and an extremely strong yellow-green fluorescence. They may be purified by removing unchanged pyrene by sublimation under reduced pressure. The final products thus freed from pyrene may be sublimated under more strongly reduced pressure. The new products contain from 2 to about 5 pyrene radicals combined with each other by way of carbon atoms. Due to their solubility in organic liquids they may be employed for coloring and/or imparting fluorescence to hydrocarbons especially mineral oils, hydrocarbon type solvents, paraffin oil, lubricating oils, vaseline and the like. In some cases the reaction product consists of a mixture of different substances of the said kind. Individuals may be recovered therefrom by crystallization in stages as for example from pyridine or chlorbenzene.

The following example serves to illustrate how the invention may be carried out in practice. The invention is, however, not restricted to this example.

Example

A mixture of 500 grams of vaporized pyrene and 50 liters of nitrogen is led per hour through a copper tube having a diameter of 8 centimeters and a length of 150 centimeters, which is heated from outside to a temperature of between 810 and 830° C. The vapors leaving the tube are cooled preferably by using a glass or metal tube having a space of about 15 liters and being cooled by a stream of cold air or water. The product is a claret-red crystalline powder. It is purified by sublimation and recrystallization. It is readily soluble in hydrocarbons and hydrocarbon type solvents giving a yellow coloration and a vivid yellow-green fluorescence.

What we claim is:

1. A process of producing conversion products of pyrene which consists in bringing pyrene in the vapor phase in a vigorous stream into contact with walls heated to a temperature between 600 and 850° C.

2. A process of producing conversion products of pyrene which consists in bringing pyrene in the vapor phase in a vigorous stream into contact with walls heated to a temperature of between 750 and 850° C.

3. A process of producing conversion products of pyrene which consists in bringing a mixture of pyrene in the vapor phase and an inert gas selected from the class consisting of nitrogen, carbon dioxide and steam in a vigorous stream into contact with walls heated to a temperature of from 810 to 830° C.

4. A conversion product of pyrene of the class of di-, tri-, tetra- and pentapyrenyls which conversion product dissolves very readily in hydrocarbons and hydrocarbon type solvents giving a yellow coloration and a vivid yellow-green fluorescence.

5. A conversion product of pyrene being a tetrapyrenyl having a melting point of above 300° C. and a molecular weight of about 800, which conversion product dissolves very readily in hydrocarbons and hydrocarbon type solvents giving a yellow coloration and a vivid yellow-green fluorescence.

HANS SCHOENHERR.
HEINRICH HOPFF.